April 16, 1963 D. S. PRESTON 3,086,071
FLEXIBLE ELECTRICAL CABLE AND METHOD OF MAKING THE SAME
Filed Aug. 28, 1959
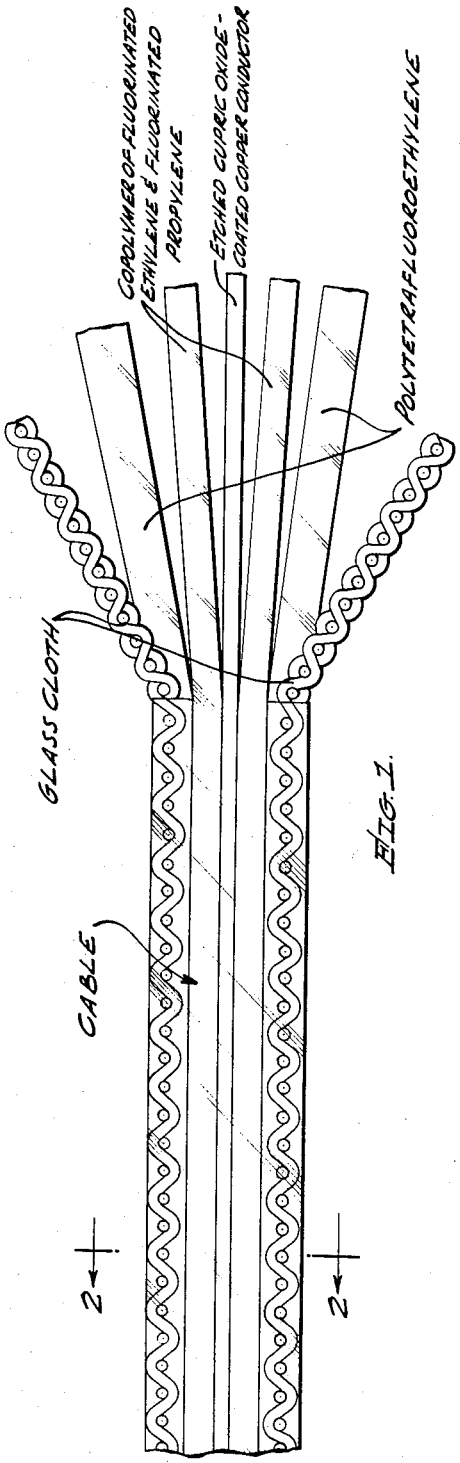
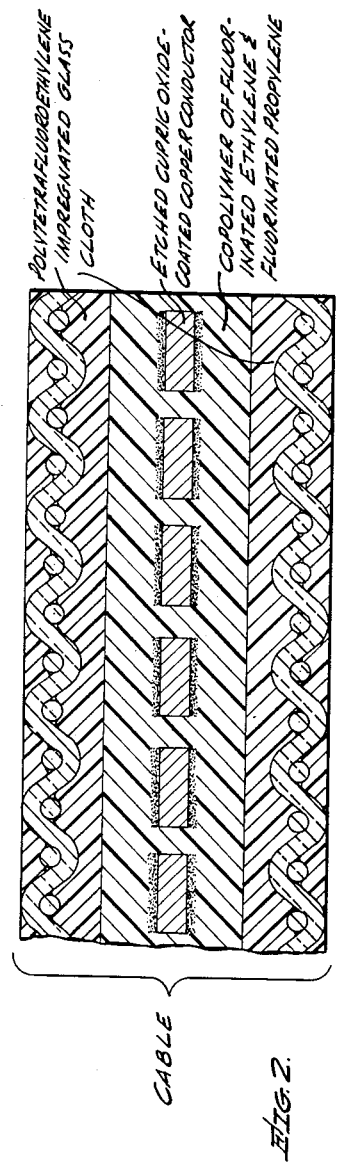
INVENTOR.
DANIEL S. PRESTON,
BY John M. Koch
ATTORNEY.

United States Patent Office 3,086,071
Patented Apr. 16, 1963

3,086,071
FLEXIBLE ELECTRICAL CABLE AND METHOD
OF MAKING THE SAME
Daniel S. Preston, Los Angeles, Calif., assignor to Hughes Aircraft Company, Culver City, Calif., a corporation of Delaware
Filed Aug. 28, 1959, Ser. No. 837,566
4 Claims. (Cl. 174—117)

This invention relates to an electrical cable, a method of constructing an electrical flexible cable for high temperature applications and especially a flat flexible electrical cable of the type employed with oscillating devices, such as antennas and resolvers.

The design of electronic systems sometimes requires electrical connections between moving or oscillating equipment and cooperating stationary equipment. Prior art arrangements accomplished these connections by utilizing multi-conductor cables. In some applications space limitations and electrical characteristics limit the length of multi-conductor cables that can be employed. In other applications necessitating the use of cables of short length, flexure loops of limited size are necessary to follow movement, such as azimuth and elevation scanning of an oscillating radar reflector. In such cases, the cable is subjected to short radius axial flexing and radial torsion. Operation under adverse conditions of high stress, high relative humidity and elevated temperatures, such as in antenna compartments, reduces the life of the cables below design requirements. In addition to the consideration of space and configuration requirements and physical properties of the materials employed in the flexible cable, chemical properties such as resistance to hydraulic fluids and moisture and oxidation stability also must be satisfactorily controlled. Attempts to prolong the life of cables in such applications have involved the investigation of stainless steel reinforced copper and high strength copper alloys for the purpose of determining the feasibility of extending cable life with a minimum reduction in conductivity and a minimum increase in weight. The life of an antenna cable also can be extended by increasing the radii of the bends in flexure loops and by eliminating torsional effects during scanning operations. However, only limited improvement can be obtained by such modifications and frequently limitations in space preclude any appreciable improvement by the use of such modifications.

Accordingly, it is an important object of this invention to provide a method of fabricating a flexible cable having desirable physical properties and a high degree of chemical stability.

Additional objects will become apparent from the following description of the invention.

Stated in general terms, the objects of this invention are attained by providing a method of fabricating a cable comprising impregnating a strip of fabric, such as glass cloth, with a plastic electrical insulating material, such as a thermoplastic material, preferably a film of plastic fluorocarbon, attaching a strip of electrical conducting material, such as a strip of copper, to the plastic-impregnated fabric, forming a predetermined pattern of electrical conductors in the electrical conducting material, and attaching a second strip of plastic impregnated fabric to the conductor pattern for the purpose of forming an integral flexible cable in which the conductor pattern is sandwiched between the strips of insulating plastic impregnated fabric.

A description of a preferred embodiment of the invention is given below primarily for purposes of illustration and not limitation.

A strip of glass cloth, of somewhat larger dimensions than those of the desired cable, is thoroughly cleaned and impregnated with a film of plastic fluorocarbon. The cleaning operation can be performed by treating the glass cloth with an open flame to burn off any combustible material. Examples of plastic fluorocarbons that can be used are: polytetrafluoroethylene, sold on the market by E. I. du Pont de Nemours and Company under the trademark "Teflon," and copolymers of fluorinated ethylene and fluorinated propylene, sold by E. I. du Pont de Nemours and Company under the trademark "Teflon." Instead of impregnating a strip of glass cloth with plastic fluorocarbon, a suitable impregnated glass cloth available on the market can be used. For example, a polytetrafluoroethylene resin impregnated glass cloth sold on the market by E. I. du Pont de Nemours and Company under the trademark "Armalon" can be used.

When using the polytetrafluoroethylene resin impregnated strip of glass cloth, such as "Armalon," the impregnated glass cloth is additionally provided with a strip of plastic fluorocarbon, such as a strip of resinous copolymer of fluorinated ethylene and fluorinated propylene. In this case, a strip of resinous copolymer of fluorinated ethylene and fluorinated propylene is heat sealed to the "Armalon," at about 690° F. and about 75 lbs./sq. in., maintained for about 1½ minutes, to produce a composite strip of glass cloth and plastic fluorocarbon layers. This heat sealing operation preferably is performed between the jaws of a press employing a suitable mold release material, such as a silicone preparation, for example.

A strip of copper foil is provided with a thin coating of cupric oxide by submerging the strip in a bath containing a caustic alkali together with strong oxidizing agents. A product of this type containing 1.5 ozs. sodium hydroxide and 0.5 oz. ammonium persulfate per gallon of water, and sold by Enthane Company, New Haven, Connecticut under the trademark "Ebonol C" has been found to be satisfactory. The cupric oxide coated copper foil is heat sealed to the plastic fluorocarbon layer of the composite strip of impregnated glass cloth and plastic fluorocarbon layers prepared as described immediately above, by conducting the heat sealing operation at about 575° F. and about 750 lbs./sq. in. maintained for about 1½ minutes. The exposed cupric oxide surface of the attached copper foil is etched to produce a desired circuit pattern. This can be done by printing on the copper foil an etch resistant ink in the desired pattern, etching away all of the copper that is not protected by the ink pattern, and thereafter removing the ink to expose the desired conductive pattern.

A second strip of glass cloth is impregnated with plastic fluorocarbon as described above. In the special case described above, this second strip can be a strip of "Armalon" or a strip of glass cloth impregnated with polytetrafluoroethylene resin. The second strip of "Armalon" or polytetrafluoroethylene resin impregnated glass cloth is provided with a strip of resinous copolymer of fluorinated ethylene and fluorinated propylene by the heat sealing technique described above to produce a second composite strip of glass cloth and plastic fluorocarbon layers. This second composite strip of plastic fluorocarbon and impregnated glass cloth is heat sealed to the exposed surface of the etched, cupric oxide coated copper circuit pattern attached to the plastic fluorocarbon layer of the first composite strip of glass cloth and plastic fluorocarbon layers mentioned above. This heat sealing operation is conducted at about 550° F. and about 100 lbs./sq. in. maintained for about 45 seconds. Thus an integral sandwich construction is made of a group of strips or layers of material placed on top of each other in the following order:

Polytetrafluoroethylene resin impregnated glass cloth or or "Armalon"
Copolymer of fluorinated ethylene and fluorinated propylene
Etched cupric oxide coated copper conductor
Copolymer of fluorinated ethylene and fluorinated propylene
Polytetrafluoroethylene resin impregnated glass cloth or "Armalon."

The resulting flexible cable structure is trimmed to the desired length and width to produce the desired flat flexible cable.

FIG. 1 is a schematic, side elevational view, drawn to a greatly enlarged scale, showing the relationship of the various strips at the right which are joined to form the flexible electrical cable at the left of the view; and FIG. 2 is a cross-sectional view taken along line 2—2 of FIG. 1, showing the relationships of the various strips in the formed cable.

It will be understood that although certain plastic fluorocarbons were mentioned in connection with the method described above, other suitable temperature resistant plastic fluorocarbons also can be used. In general, temperature resistant thermoplastic resins or plastic materials are suitable if chosen with a view toward the requirements of thermal stability and mechanical strength to which the electrical cable will be subjected. Similarly, the glass fabric or glass cloth described in the method above can be replaced by other suitable fabrics or cloths of the required tensile strength and electrical insulating properties.

In the method described above, the copper foil was provided with a coating of cupric oxide. This cupric oxide coating provided a surface suitable for firmly bonding the fluorocarbon strip thereto. It will be understood that the cupric oxide treatment of the original copper foil can be replaced by suitable equivalent treatments which serve to provide the copper foil with a surface which will bond with thermoplastic materials, such as fluorocarbon resins or plastic materials.

It has been found that flexible cables prepared by the use of the above described method are superior to cables prepared by the use of an adhesive bonding material instead of the heat sealing step. In particular, cables prepared by the method of the invention exhibit very good flexural characteristics, a high degree of fluid resistance, extremely good heat resistance and a very reliable bonded construction for extremely severe applications. These superior characteristics of flexible cables produced by the method of the invention also result in much longer and more reliable service life than conventional multi-conductor cables or cables made by the use of adhesive bonded constructions.

In the specific example given above, the plastic fluorocarbon was described as being applied to the glass fabric, or other fabric or cloth, in the form of a strip of plastic material. It will be understood that the method of the invention is not limited to such application of the plastic material to the fabric for the purpose of impregnating the fabric or forming the laminated structure. Other suitable methods of applying the plastic material can be used. For example, a dispersion of the plastic material in a suitable liquid phase can be used to apply the plastic material of the fabric and to build up the laminate structure of the cable.

Among the difficulties solved by the method of the invention described above are the following. Thermoplastic fluorocarbon films or strips often prove difficult to handle in a press of the type employed. In addition, without reinforcement of such fluorocarbon films or strips, temperatures and pressures employed in the press must be critically adjusted to prevent squeeze-out of resin during the pressing operation. Squeeze-out difficulties usually are accompanied by movement of the etched conductor pattern attached to the resin or plastic strip. The temperatures and pressures employed in a given case can be reduced to minimize this squeeze-out and conductor movement problem, but this in turn usually causes an undesirable reduction in the bonding strength between the copper and the plastic or resin. It was found that the introduction of glass or other fabric reinforcement, in accordance with the method of the invention, controlled squeeze-out and conductor movement problems without reducing the bonding strength between the resin and the copper. In addition, the cloth reinforcement serves to mechanically strengthen the flexible cable and to prolong its service life when used at elevated temperatures.

The method described above utilizes commercially available materials and employs the unique properties of these materials to advantage. Furthermore, the cable produced by this method is composed of compatible materials and is highly resistant to destructive forces. No specialized equipment is required to carry out the method. A suitable laminating press, or the equivalent thereof, is available on the market. The cable produced by the method of the invention is low in volume and weight and can be wound on reels or accordion-pleated for various applications.

It will be apparent that many modifications and variations of the present invention can be made in the light of the teachings given hereinabove without departing from the spirit and scope of the invention. It is therefore to be understood that within the scope of the appended claims, the invention can be practiced otherwise than as described hereinabove.

What is claimed is:

1. The method of fabricating a flat flexible cable comprising impregnating a flat strip of glass cloth with a plastic tetrafluoroethylene polymer, heat-sealing a flat strip of plastic copolymer of fluorinated ethylene and fluorinated propylene to the strip of impregnated glass cloth to form a flat composite strip, heat-sealing a flat sheet of cupric oxide coated copper foil to the copolymer surface of the composite strip of impregnated glass cloth and copolymer, forming a plurality of spaced electrical conductors in the copper foil, impregnating a second flat strip of glass cloth with plastic tetrafluoroethylene polymer, heat-sealing a flat sheet of copolymer of fluorinated ethylene and fluorinated propylene to this second strip of impregnated glass cloth to form a second flat composite strip, and heat-sealing this second composite strip of impregnated glass cloth and copolymer to the spaced conductors for forming an integral flexible cable with the conductors sandwiched between the composite strips of impregnated glass cloth and copolymer.

2. The method of fabricating a flat flexible cable comprising impregnating a flat strip of glass cloth with a plastic tetrafluoroethylene polymer, heat sealing at about 690° F. and about 75 lbs./sq. in. a flat strip of plastic copolymer of fluorinated ethylene and fluorinated propylene to the strip of impregnated glass cloth to form a flat composite strip, heat sealing at about 575° F. and about 750 lbs./sq. in. a flat sheet of cupric oxide coated copper foil to the copolymer surface of the composite strip of impregnated glass cloth and copolymer, forming a plurality of spaced electrical conductors in the copper foil, impregnating a second flat strip of glass cloth with plastic tetrafluoroethylene polymer, heat sealing at about 690° F. and about 75 lbs./sq. in. a flat strip of copolymer of fluorinated ethylene and fluorinated propylene to this second strip of impregnated glass cloth to form a second flat composite strip, and heat sealing at about 550° F. and about 100 lbs./sq. in. this second composite strip of impregnated glass cloth and copolymer to the spaced conductors for forming an integral flexible cable with the conductors sandwiched between the composite strips of impregnated glass cloth and copolymer.

3. A flat flexible cable comprising a plurality of spaced conductors, a flat layer of a copolymer of fluoroethylene and fluoropropylene outwardly of each side of the conductor pattern, and a flat layer of glass cloth impregnated with a plastic tetrafluoroethyl polymer outwardly of each layer of copolymer joined together to form a unitary cable.

4. A flat flexible cable according to claim 3, wherein the plurality of spaced conductors consist of cupric oxide coated copper.

References Cited in the file of this patent

UNITED STATES PATENTS

| | | |
|---|---|---|
| 2,400,099 | Brubaker et al. | May 14, 1946 |
| 2,606,134 | Sanders | Aug. 5, 1952 |
| 2,691,694 | Young | Oct. 12, 1954 |
| 2,876,393 | Tally et al. | Mar. 3, 1959 |
| 2,963,538 | Dahlgren | Dec. 6, 1960 |

FOREIGN PATENTS

| | | |
|---|---|---|
| 525,847 | Canada | June 5, 1956 |